(12) United States Patent
Yeggy et al.

(10) Patent No.: US 12,377,616 B2
(45) Date of Patent: Aug. 5, 2025

(54) DEVICE FOR STABILIZING LOCALIZED DOME REINFORCEMENT

(71) Applicant: Hexagon Technology AS, Alesund (NO)

(72) Inventors: Brian Yeggy, Lincoln, NE (US); Collin Humphrey, Lincoln, NE (US)

(73) Assignee: HEXAGON TECHNOLOGY AS, Alesund (NO)

( * ) Notice: Subject to any disclaimer, the term of this patent is extended or adjusted under 35 U.S.C. 154(b) by 377 days.

(21) Appl. No.: 18/076,551

(22) Filed: Dec. 7, 2022

(65) Prior Publication Data

US 2023/0202125 A1 Jun. 29, 2023

Related U.S. Application Data

(60) Provisional application No. 63/293,279, filed on Dec. 23, 2021.

(51) Int. Cl.
*B32B 41/00* (2006.01)
*B29C 53/56* (2006.01)
(Continued)

(52) U.S. Cl.
CPC ............ *B29C 70/34* (2013.01); *B29C 53/566* (2013.01); *B29C 70/32* (2013.01); *B29L 2031/7156* (2013.01)

(58) Field of Classification Search
CPC ....... B29C 70/34; B29C 53/566; B29C 70/32; B29C 53/605; B29C 53/602;
(Continued)

(56) References Cited

U.S. PATENT DOCUMENTS 3,748,203 A 7/1973 Greene
4,308,999 A 1/1982 Carter
(Continued)

FOREIGN PATENT DOCUMENTS

DE 11 54 335 B 9/1963
DE 36 18 045 A1 12/1986
(Continued)

OTHER PUBLICATIONS

International Search Report and Written Opinion for International Application No. PCT/US2022/052247, mailed on Jul. 13, 2023, 8 pages.
(Continued)

*Primary Examiner* — Michael N Orlando
*Assistant Examiner* — Joshel Rivera
(74) *Attorney, Agent, or Firm* — Mai D. Lauer; Westman, Champlin & Koehler, P.A.

(57) ABSTRACT

An assembly is configured for use in a system for forming filament windings on a vessel having a circumference and a length. The assembly includes an endless belt and first and second rollers. The endless belt is configured to wrap partially around the circumference of the vessel to contact and impart pressure on a filament winding disposed on an outside surface of the vessel. The endless belt moves around the first and second rollers. A space is disposed between the first and second rollers to allow a filament wind eye of the system to move in a reciprocal motion along the length of the vessel. A method of using a machine for forming filament windings on a vessel having a circumference and a length is also described.

20 Claims, 14 Drawing Sheets

(51) Int. Cl.
*B29C 70/32* (2006.01)
*B29C 70/34* (2006.01)
*B29L 31/00* (2006.01)

(58) Field of Classification Search
CPC ......... B29C 53/8016; B29L 2031/7156; B29L 2031/7172; F17C 1/06; F17C 1/16
USPC ............ 156/60, 64, 350, 351, 378, 379
See application file for complete search history.

(56) References Cited

U.S. PATENT DOCUMENTS

| | | |
|---|---|---|
| 4,723,395 A | 2/1988 | Koutonen |
| 5,538,588 A | 7/1996 | Martinez |
| 6,605,171 B1 | 8/2003 | Debalme et al. |
| 7,316,327 B2 | 1/2008 | Wright et al. |
| 8,790,476 B2 | 7/2014 | Kaltenborn et al. |
| 9,879,825 B2 | 1/2018 | Kaneko et al. |
| 2013/0209750 A1 | 8/2013 | Van Berlo |
| 2018/0356037 A1 | 12/2018 | Yokoi |
| 2019/0105851 A1 | 4/2019 | Nozawa |
| 2020/0224823 A1 | 7/2020 | Hatta |
| 2021/0197501 A1* | 7/2021 | Ikezaki .................. B29C 70/16 |

FOREIGN PATENT DOCUMENTS

| | | |
|---|---|---|
| JP | 2018-114629 A | 7/2018 |
| KR | 20200024659 A | 3/2020 |
| WO | 2018135155 A1 | 7/2018 |

OTHER PUBLICATIONS

"Approach: Automatic Fiber Placement—Boeing," Article, dated Jul. 15, 2021, 1 page.

Japanese Notice of Rejection for related JP Application No. 2024-538471, dated May 20, 2025, 5 pages.

* cited by examiner

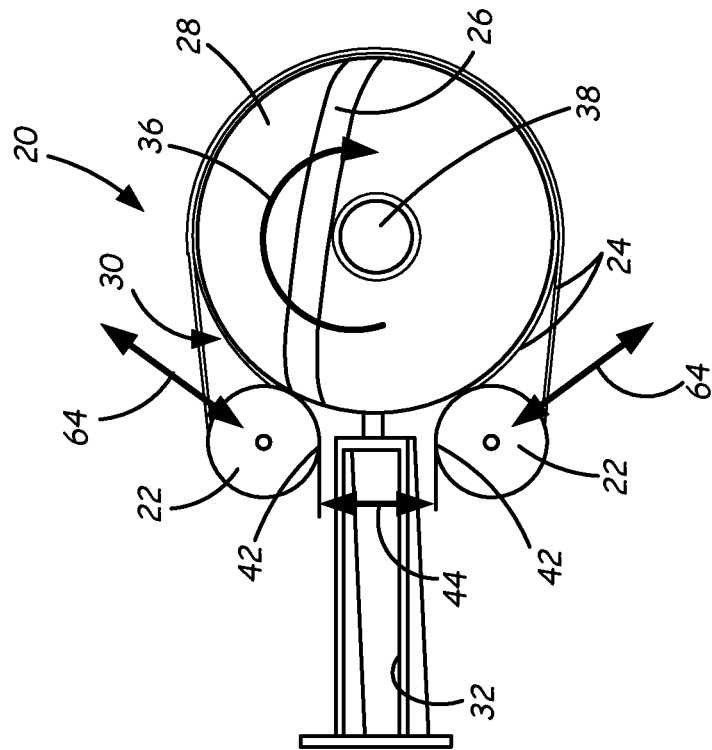
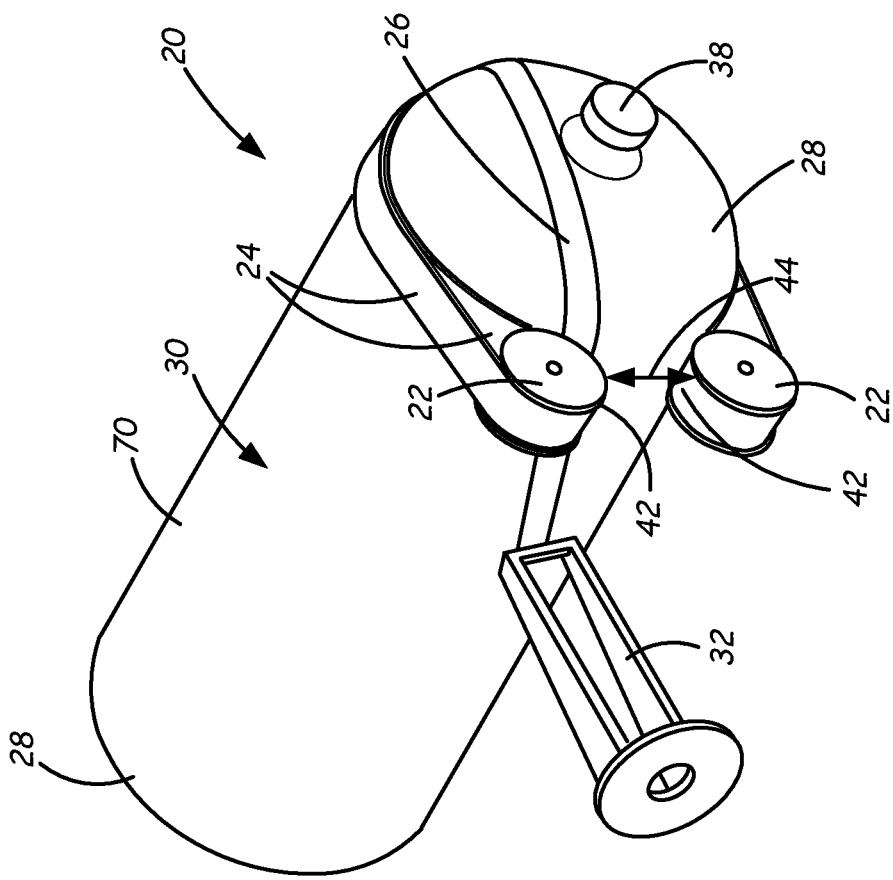
FIG. 2
FIG. 1

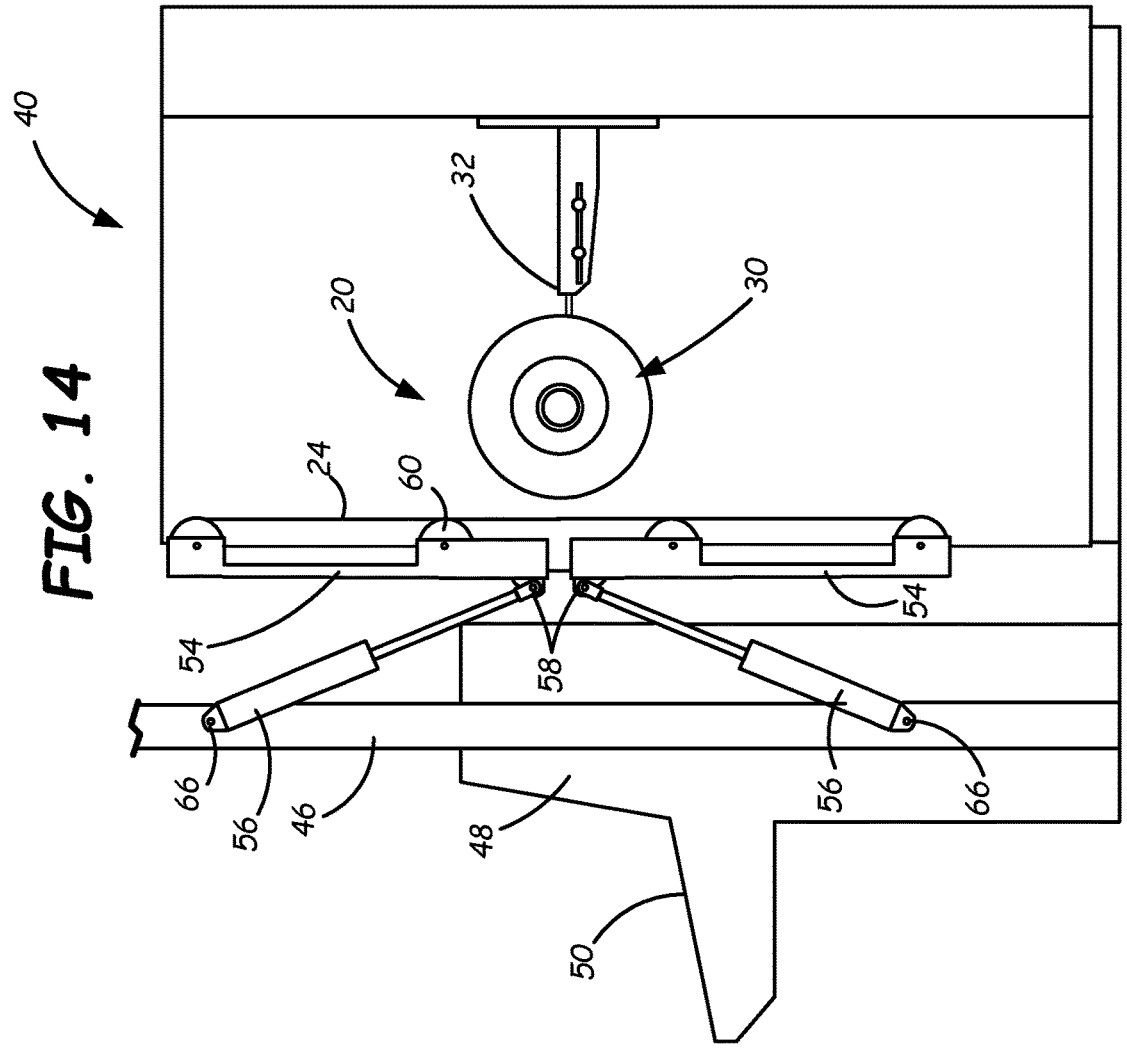

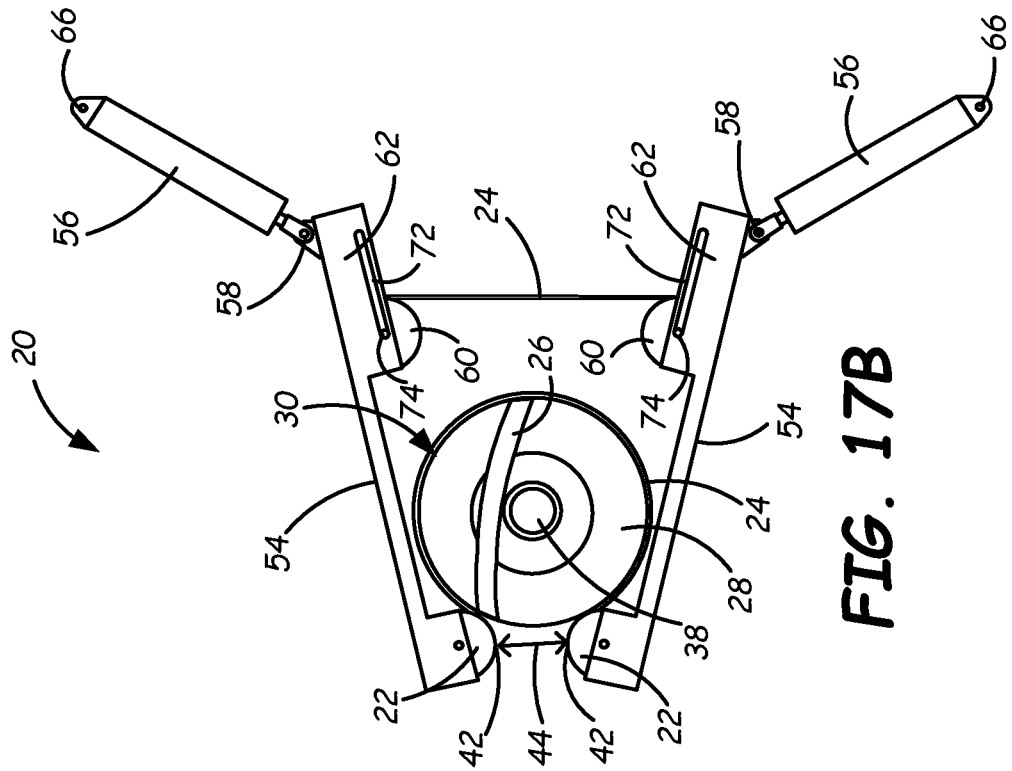
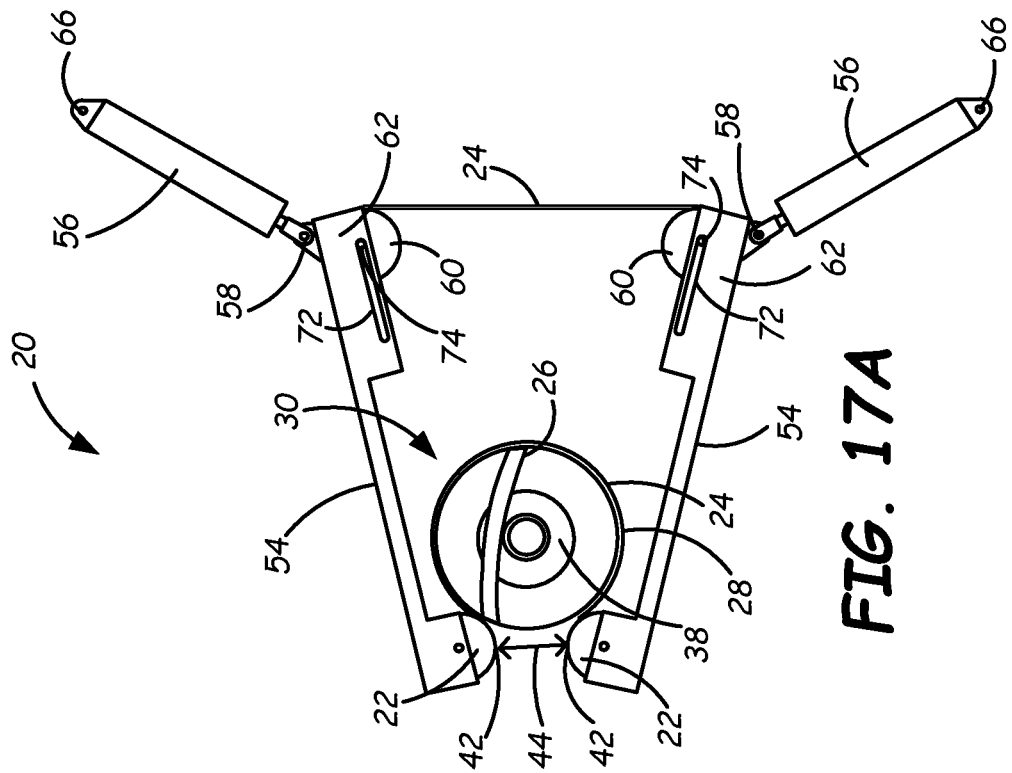

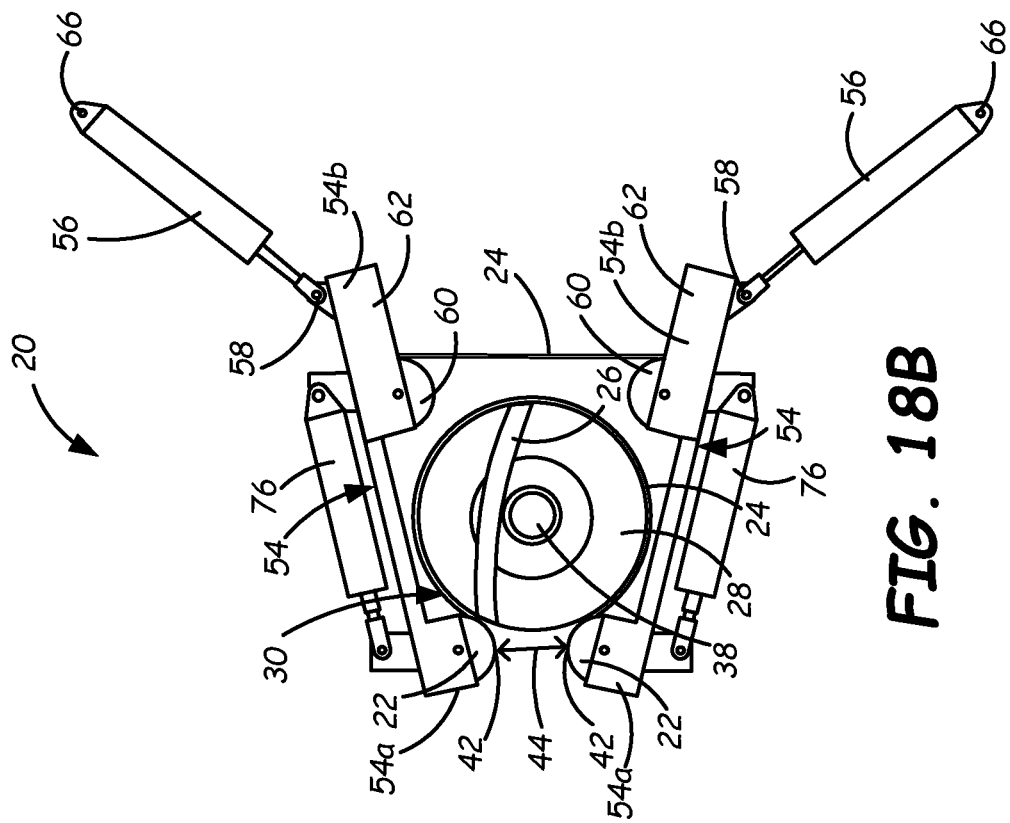
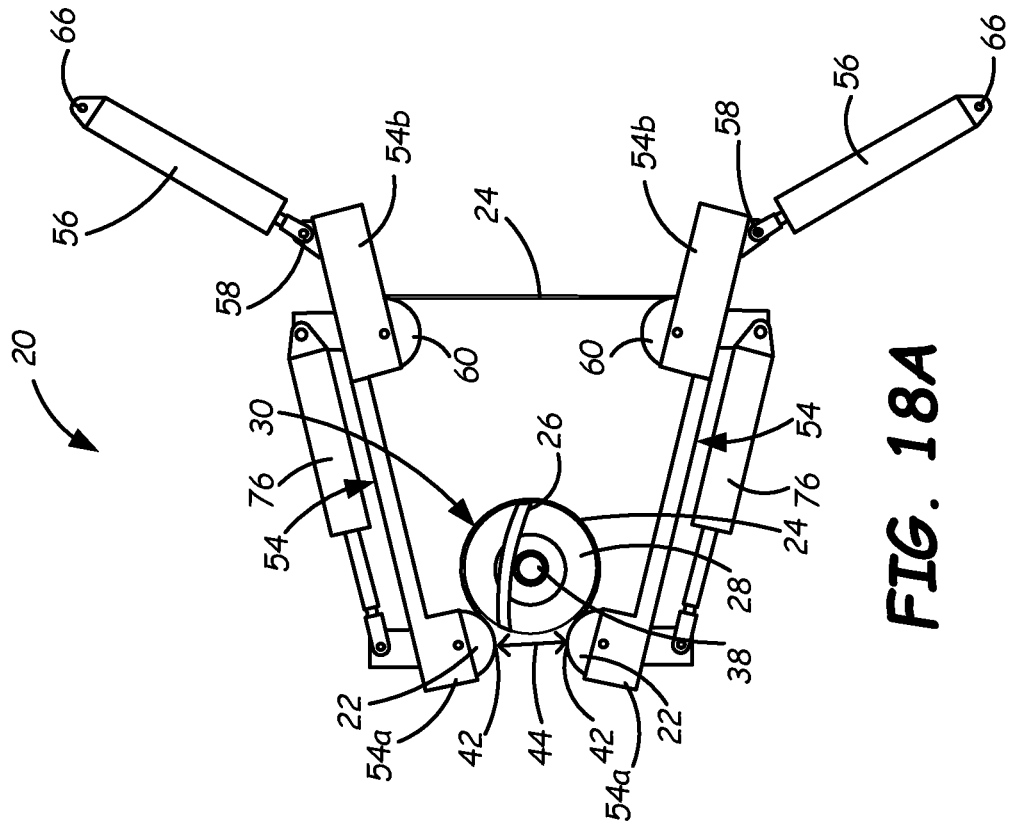

DEVICE FOR STABILIZING LOCALIZED DOME REINFORCEMENT

CROSS REFERENCE TO RELATED APPLICATIONS

This application claims the benefit of priority from U.S. Provisional Patent Application No. 63/293,279, filed on Dec. 23, 2021; the content of the priority application is hereby incorporated by reference in its entirety.

BACKGROUND

Pressure vessels are commonly used for containing a variety of fluids under pressure, such as hydrogen, oxygen, natural gas, nitrogen, propane, methane and other fuels, for example. Generally, pressure vessels can be of any size or configuration. The vessels can be heavy or light, single-use (e.g., disposable), reusable, subjected to high pressures (greater than 50 pounds per square inch (psi) (344.7 kilopascal), for example), low pressures (less than 50 psi (344.7 kilopascal), for example), or used for storing fluids at elevated or cryogenic temperatures, for example.

Pressure vessels are subject to damage during transportation and use due to, for example, collision with other objects or being dropped. The ability of a vessel to retain a fluid at a desired pressure may be compromised by such damage. An existing approach to damage mitigation is to adhere a protective cap to an end of the vessel. However, caps that are merely adhered to the vessel may become dislodged during vessel use. Other approaches include increasing the shell thickness, applying elastomer shell coatings, and adding protective layers or end caps that are fully covered or encapsulated by additional shell material. For further details, please see commonly owned U.S. Pat. No. 5,476,189 for a "Pressure Vessel with Damage Mitigating System" and commonly owned U.S. Pat. No. 10,627,049 for a "Wound-In End Protection Component for Pressure Vessel," which are hereby incorporated by reference. Because additional coatings or layers generally fully cover a damage-mitigating piece or the entire vessel, some approaches have the disadvantage of significantly increased material usage and manufacturing complexity.

SUMMARY

In one aspect, an assembly is configured for use in a system for forming filament windings on a vessel having a circumference and a length. The assembly comprises an endless belt and first and second rollers. The endless belt is configured to wrap partially around the circumference of the vessel to contact and impart pressure on a filament winding disposed on an outside surface of the vessel. The endless belt moves around the first and second rollers. A space is disposed between the first and second rollers to allow a filament wind eye of the system to move in a reciprocal motion along the length of the vessel.

In another aspect, a method of using a machine for forming filament windings on a vessel having a circumference and a length is described. The method comprises rotating the vessel on a rotating shaft; moving a filament wind eye in a reciprocal motion along the length of the vessel while depositing a filament winding on an outside surface of the vessel; and wrapping an endless belt assembly partially around the circumference of the vessel to contact and impart pressure on the filament winding. A space is disposed in the assembly at the outside surface of the vessel to allow passage of the filament wind eye.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. All descriptions are applicable to like and analogous structures throughout the several embodiments, unless otherwise specified.

FIG. 1 is a perspective view of an assembly of a pressure vessel and an exemplary device for stabilizing localized dome reinforcement on the pressure vessel. A wind eye of a filament winding machine is in a left position.

FIG. 2 is an end view of the components of FIG. 1, taken from a right end of FIG. 1.

FIG. 13 is an end elevation view, taken from the left side of FIG. 12 and showing the pressure vessel and retracted device.

FIG. 14 is an end elevation view, taken from the right side of FIG. 12 and showing the retracted device in the context of the filament winding machine.

FIG. 17A is an end elevation view, taken from the left side of FIG. 9, showing a smaller pressure vessel with an extended device having rollers moveable along the channel of the support arm.

FIG. 17B is similar to FIG. 17A but shows the rollers in a different position in the channel and with a larger pressure vessel.

FIG. 18A is an end elevation view, taken from the left side of FIG. 9, showing a smaller pressure vessel with an extended device, wherein two-piece support arms are telescoped apart by position actuators.

FIG. 18B is similar to FIG. 18A, but the two-piece support arm is telescoped together, by contraction of the position actuators, to accommodate a larger pressure vessel.

Figure 3:
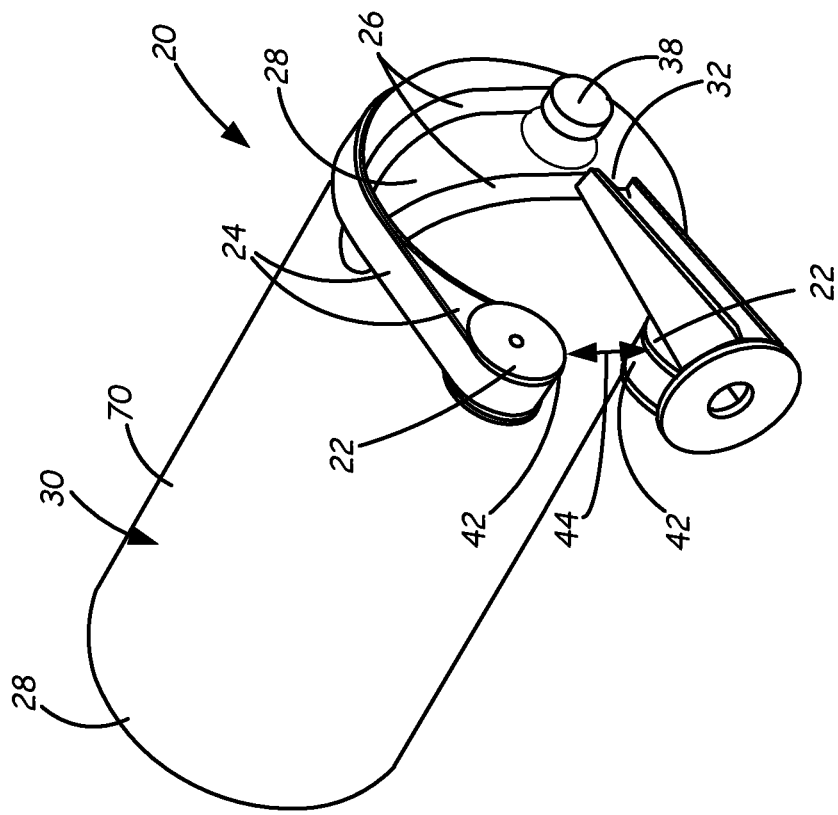
FIG. 3 is perspective view of an assembly similar to FIG. 1, but with the wind eye in an intermediate position.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

The terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps and do not supply a serial or numerical limitation on the elements or steps of the embodiments thereof. For example, "first," "second," and "third" elements or steps need not necessarily appear in that order, and the embodiments thereof need not necessarily be limited to three elements or steps. Unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. The singular forms of "a," "an," and "the" include plural references unless the context clearly dictates otherwise.

DETAILED DESCRIPTION

This disclosure recognizes that it is desirable to protect a pressure vessel against damage in a reliable and low-cost manner. It is of particular interest to protect the ends of the pressure vessel, as they may be most susceptible to damage due to their placement and generally hemispheroidal shape. In illustrative embodiments, a dome cap is formed by resin-impregnated composite filaments wrapped about the end portion of the vessel. The dome cap may be secured to the vessel at the time of vessel manufacture or may be retrofit to an existing pressure vessel at a later time. The disclosed concept uses less filament and resin than some prior protective systems in which an entire vessel is covered with layers of composite material. Moreover, formation of an end cap by cured wound filaments is more secure than adhesive bonding of a protective cap onto the end portion of the vessel.

FIG. 1 illustrates an elongated pressure vessel 30, such as that disclosed in U.S. Pat. No. 5,476,189, entitled "Pressure Vessel with Damage Mitigating System," which is hereby incorporated by reference. Such a pressure vessel 30 is typically used for storing pressurized fluids. Vessel 30 has a substantially cylindrical main body section 70 with dome ends 28. When vessel 30 is fully formed, a boss is typically provided at one or both ends of the vessel 30 to provide a port for communicating with the interior of the vessel 30. Vessel 30 can be formed with an interior fluid impermeable liner covered by an outer composite shell. A vessel end 28 typically has a hemispherical or domed shape.

Suitable pressure vessel shell materials include metals, such as steel; or composites, which may be formed of laminated layers of wound fiberglass filaments or other synthetic filaments bonded together by a thermo-setting or thermoplastic resin, for example. Composite construction of the vessels provides numerous advantages such as lightness in weight and resistance to corrosion, fatigue and catastrophic failure. These attributes are due at least in part to the high specific strengths of the reinforcing fibers or filaments that are typically oriented in the direction of the principal forces in the construction of composite pressure vessels. The composite shell resolves structural loads on the vessel.

A liner or bladder is often disposed within a composite pressure vessel shell to serve as a fluid permeation barrier, thereby sealing the vessel. Such a liner is often formed from a non-metallic (such as polymeric), resilient material and prevents internal fluids from contacting the composite material. Details relevant to the formation of an exemplary pressure vessel 30 are disclosed in U.S. Pat. No. 4,838,971, entitled "Filament Winding Process and Apparatus," which is incorporated herein by reference.

Figure 6:
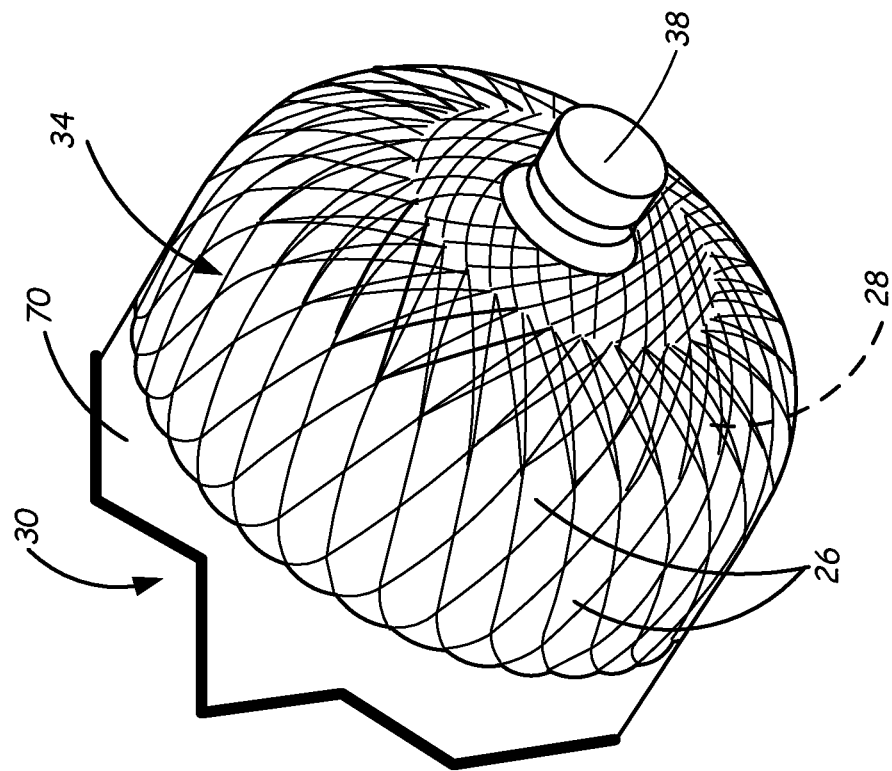
FIG. 6 is a perspective view of a pressure vessel dome end with a closed pattern of localized dome reinforcement filament bands thereon, forming a dome cap.

As shown in FIGS. 1-4, an exemplary device 20 for stabilizing localized dome reinforcement for a pressure vessel includes rollers 22 and belt 24. The device 20 is useful for gripping filament resin bands 26 as they are applied and pressing them to an outside surface of the dome end 28 of a pressure vessel 30. In an exemplary method of using device 20, wind eye 32 of winding machine 40 (shown in FIGS. 7 and 15) lays down layer upon layer of resin impregnated filament bands 26 to form a dome cap 34 for localized dome reinforcement, as shown in FIG. 6. Filament windings may include a composite material fabricated of fibers or filaments contained in a resin, the fibers being of, for example, carbon, graphite, or aramid. In this case, "composite" means a fiber reinforced resin matrix material, such as for forming a filament wound laminated structure.

As shown in FIG. 1, filament band 26 has been laid down on dome end 28 by wind eye 32. As shown in FIG. 2, the pressure vessel 30 rotates in direction 36 on a rotating shaft 39 (labeled in FIGS. 9 and 12, for example) attached to boss 38 as wind eye 32 travels left and right, as shown in FIGS.

1, 3 and 4. On a left side of FIG. 2, the top roller 22 applies pressure against a part of band 26 to prevent it from slipping toward the smaller diameter portion of dome end 28 near boss 38. On a right side of FIG. 2, belt 24 applies pressure against a part of band 26 to similarly prevent it from slipping toward the smaller diameter dome end. While the description refers to filament bands for ease of illustration and description, it is contemplated that any structure of filament windings may be used, including monofilament windings, for example.

As shown in FIGS. 1-4, in an exemplary embodiment, belt 24 is configured as an endless belt that wraps around the two rollers 22. In an exemplary embodiment, the roller and belt assembly has two ends 42 with a clearance space 44 therebetween. In some configurations, compression belt 24 is provided as an endless belt held in tension around rollers 22 and 60 (shown in FIGS. 9-14). In an exemplary embodiment, compression belt 24 has a textured surface facing the pressure vessel 30 to grip and press onto a surface of the pressure vessel 30 and/or filament band 26 in contact with the compression belt 24. Such a surface texture may be provided by integral formation of gripping elements on the belt or by the provision of additional structures such as surface spikes, for example.

Figure 4:
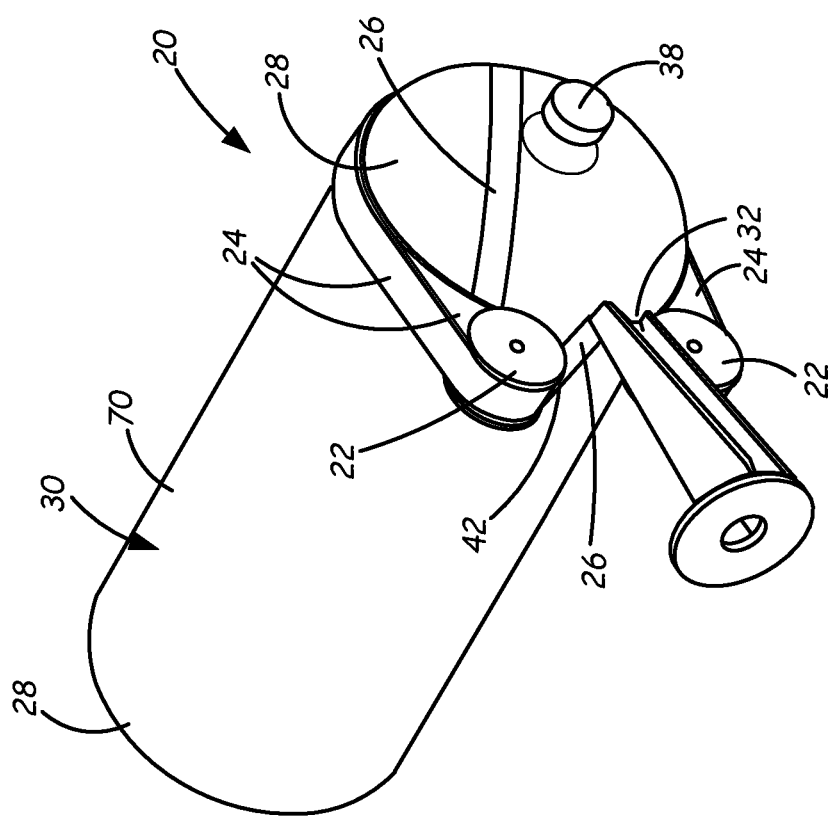
FIG. 4 is a perspective view of an assembly similar to FIG. 1, but with the wind eye in a right position.
Figure 5:
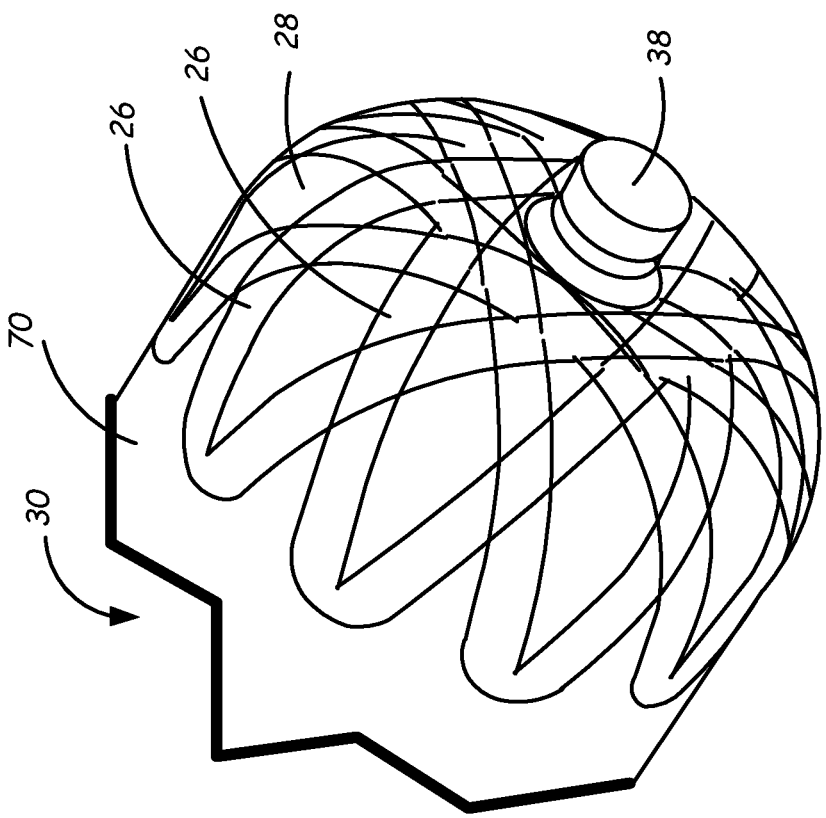
FIG. 5 is a perspective view of a pressure vessel dome end with an open pattern of localized dome reinforcement filament bands thereon.

As shown in FIGS. 1, 3 and 4, the wind eye 32 travels with a reciprocating motion left and right through clearance space 44. Simultaneously, the pressure vessel 30 rotates on rotating shaft 39 (labeled in FIGS. 9 and 12, for example) in direction 36, resulting in an open, overlapping serpentine winding pattern of bands 26, as shown in FIG. 5. In an exemplary method, the winding continues so that bands 26 layer upon themselves to form a closed pattern dome cap 34, as shown of FIG. 6. While a particular rotation direction 36 is depicted in the illustrations, it is to be understood that an opposite rotation direction can also be used.

The reciprocal left and right motion of wind eye 32, carried by carriage 52 (FIG. 9), is repeated, cycling through positions as shown in FIGS. 1-4, to form a pattern of dome reinforcement bands as shown in FIG. 5. Continued deposition of filament material in this manner eventually leads to the closed pattern of filament band 26 forming dome cap 34, as shown in FIG. 6. As shown in FIG. 4, for example, the compression belts 24 grips filament band 26 simultaneously in several locations on pressure vessel 30.

Dome cap 34 may be applied to a pressure vessel 30 in any stage of formation. For example, dome cap 34 can be applied to a polymeric liner of a pressure vessel before a remainder of a composite shell is applied to the liner. In other examples, dome cap 34 can be applied to a complete pressure vessel that already includes a composite shell. Moreover, the dome cap 34 can be applied to metallic pressure vessels and substantially cylindrical containers of many different materials and construction.

Providing for localized reinforcement of a pressure vessel at its curved dome ends 28 provides for savings in cost and manufacturing time over methods that cover the entire pressure vessel in additional layers of composite filaments. The disclosed device and method of reinforcing of pressure vessel 30 are suitably used in the formation of a dome cap 34 formed of filament bands 26 that include a resin with a relatively long pot life so that the resin may be cleaned from the compression belt 24. A suitable resin is commercially available from Huntsman Corporation of The Woodlands, Texas as Araldite epoxy resin LY1135, for example.

As shown in FIG. 6, in an exemplary embodiment, dome cap 34 completely covers dome end 28 of pressure vessel 30 and also extends onto a generally cylindrical portion 70 of pressure vessel 30 that is disposed between the two dome ends 28. Because the filament bands 26 of the dome cap 34 are pressed onto the pressure vessel 30—by the assembly of rollers 22 and belt 24—and cured thereon with pressure, the dome cap 34 is securely bonded to the pressure vessel 30. Moreover, additional filament wound composite resin strands can be disposed over dome cap 34 and pressure vessel 30 to form yet another composite shell over the vessel shown in FIG. 6.

Figure 7:
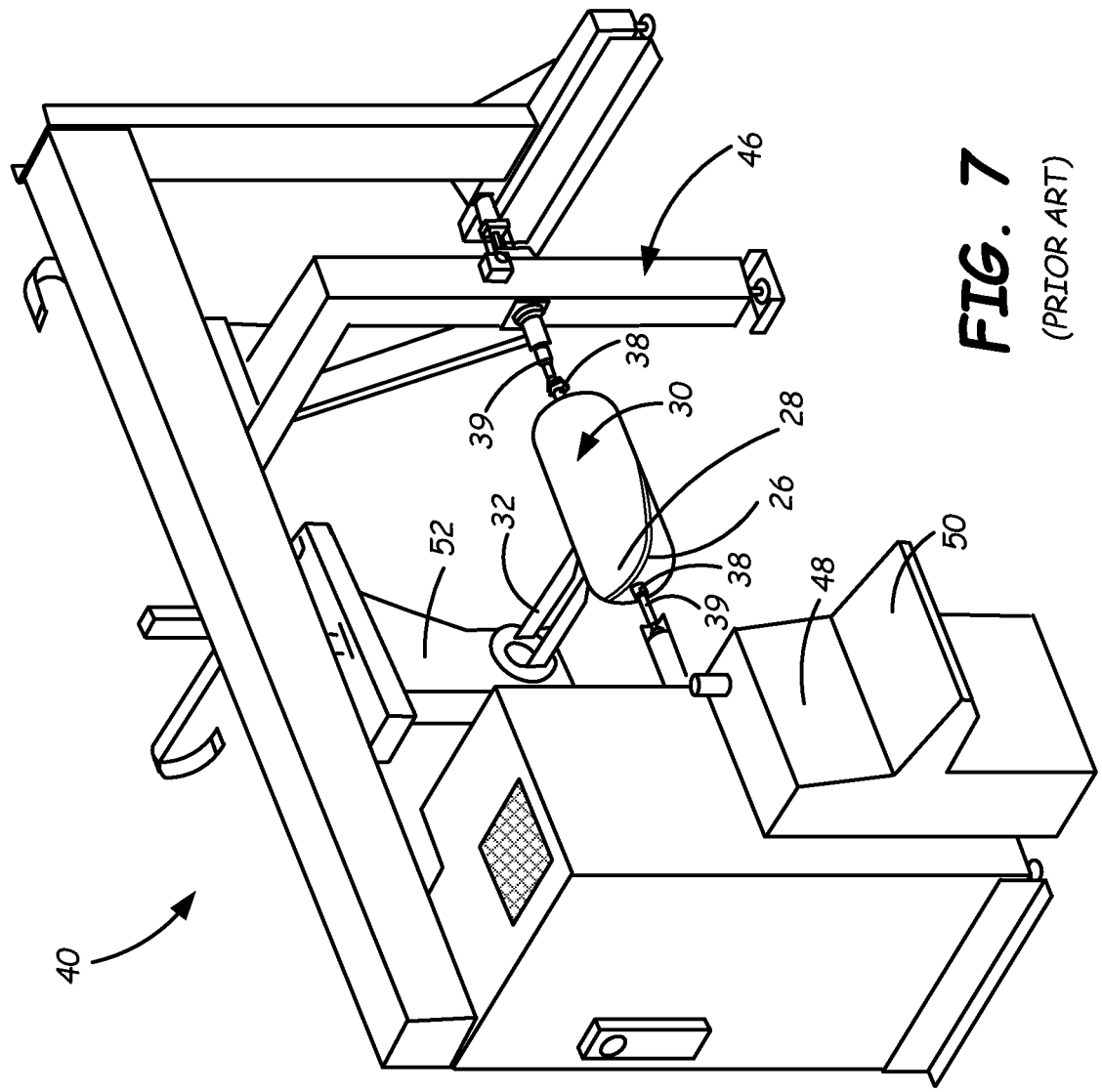
FIG. 7 is a perspective view of a filament winding machine that is suitable for use with the described stabilizing device.
Figure 8:
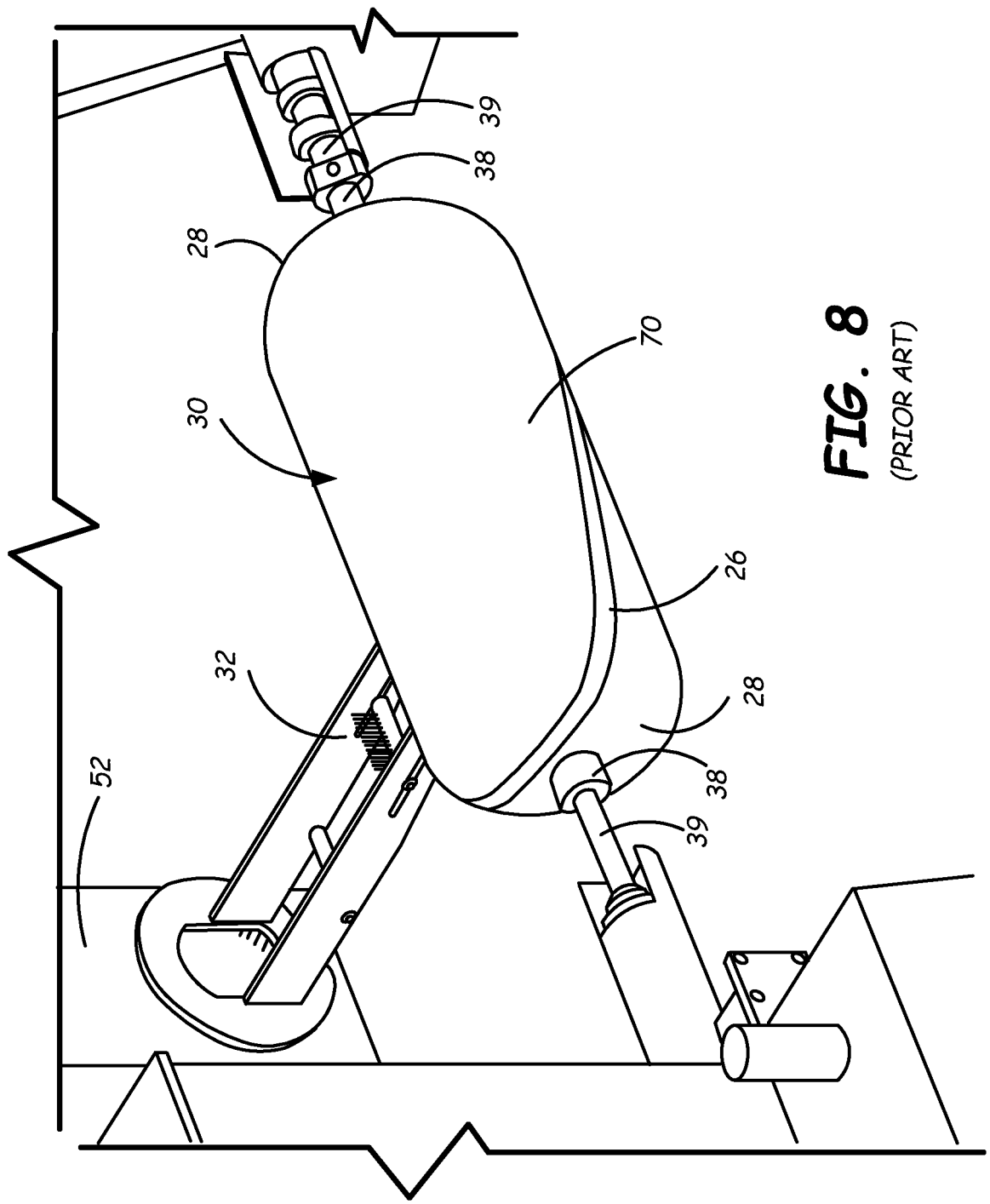
FIG. 8 is an enlarged view of a central portion of FIG. 7.
Figure 11:
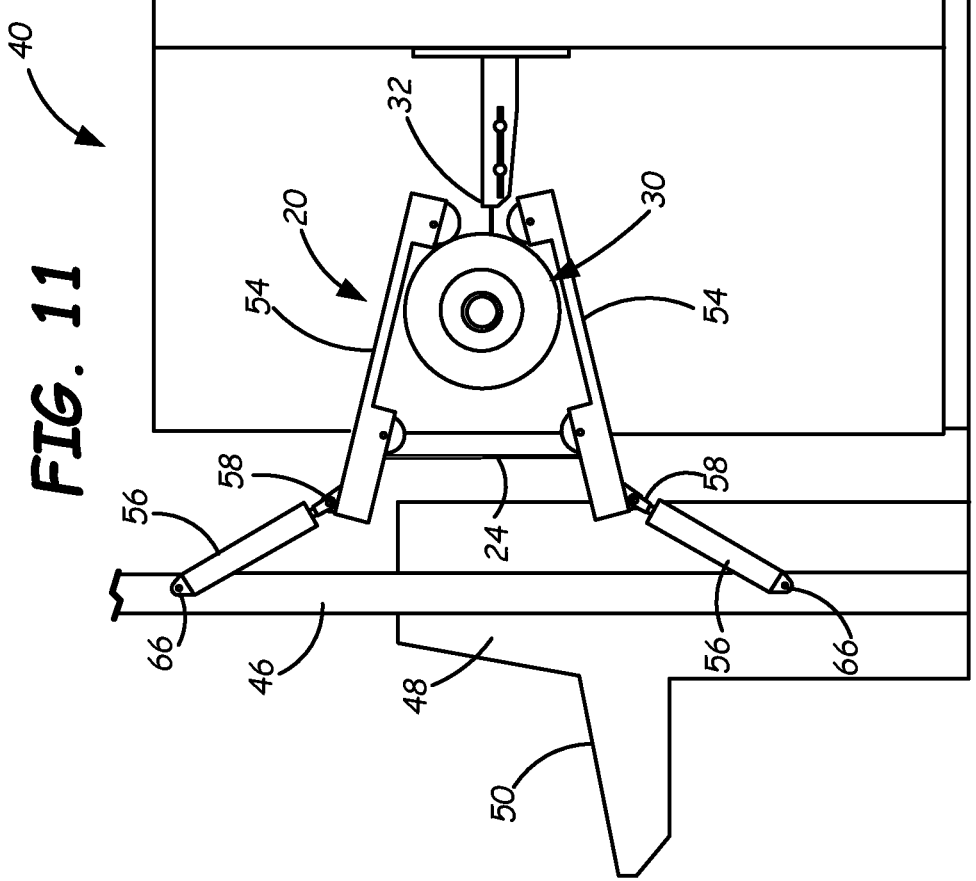
FIG. 11 is an end elevation view, taken from the right side of FIG. 9 and showing the extended device in the context of the filament winding machine.
Figure 15:
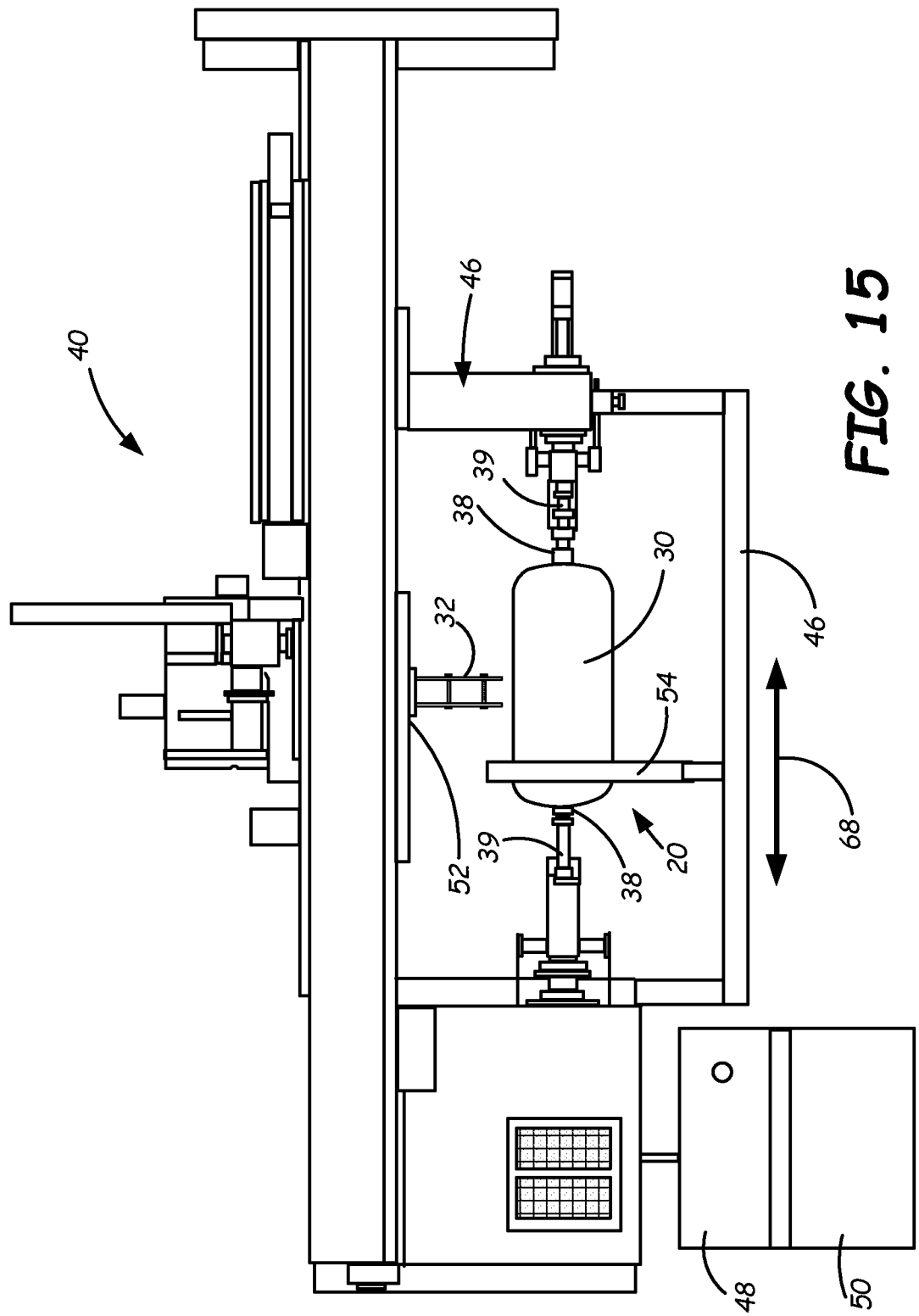
FIG. 15 is a top view of the filament winding machine of FIG. 7 with additional frame structures to support the stabilizing device as in FIG. 9.

FIG. 7 is a perspective view of a winding machine 40 suitable for use with the described device 20. Typically, winding machine 40 includes a frame 46 configured to support the pressure vessel 30 on rotating shaft 39. Winding machine 40 further includes a controller 48 that is operably connected to a user interface 50 for receiving commands regarding reciprocal linear motion of carriage 52 which supports wind eye 32, rotation of rotating shaft 39, and the laydown speed and volume of resin impregnated filament material to form filament band 26 on a dome end 28 of pressure vessel 30. Thus, different patterns and structural properties of filament bands 26 can be formed as designed and desired, upon command. As shown in FIGS. 11, 14 and 15, winding machine 40 is modified with additional members of frame 46 to support the components of device 20.

Figure 9:
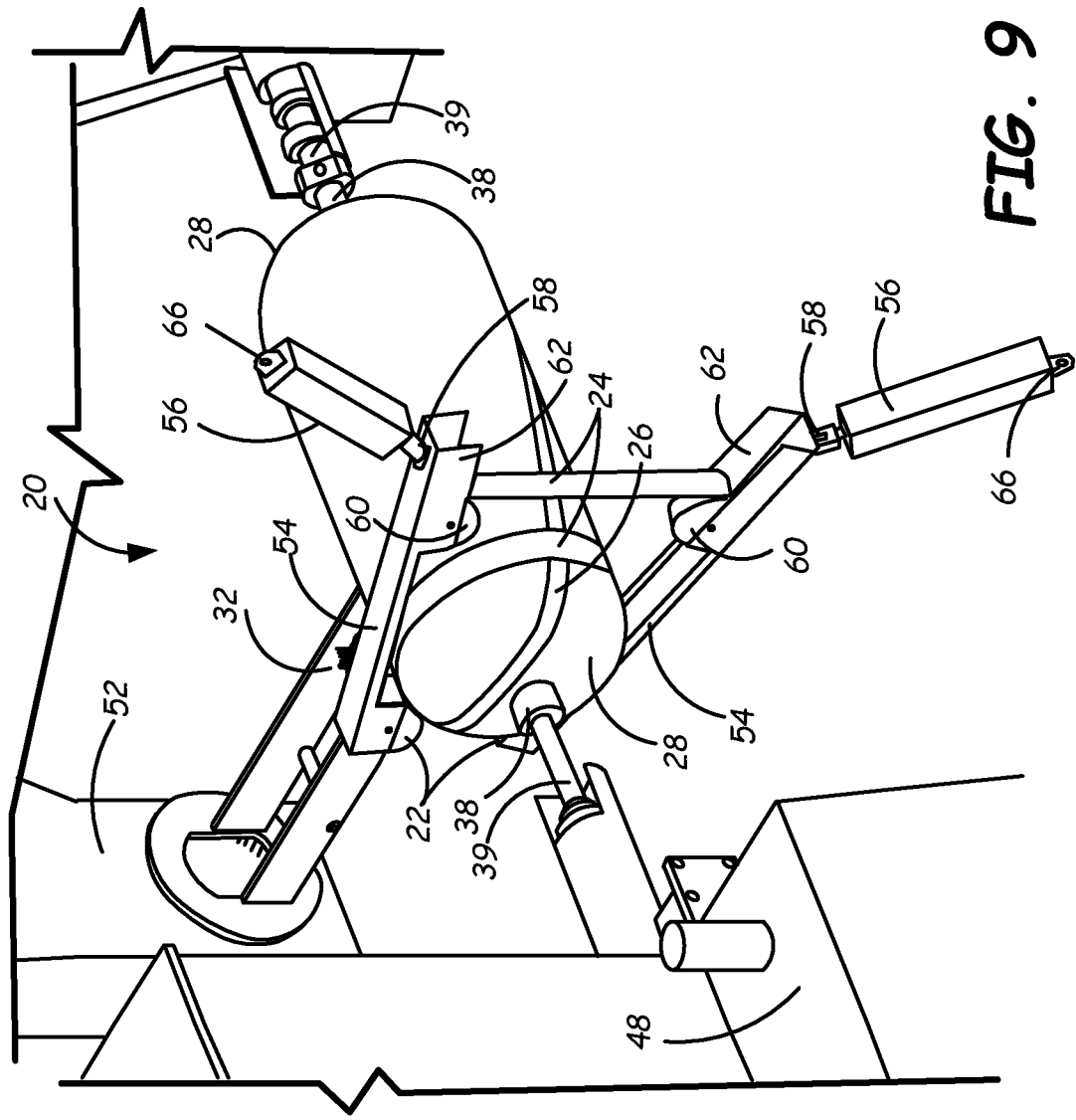
FIG. 9 is similar to FIG. 8 and additionally shows an exemplary embodiment of a described stabilizing device with a belt and roller assembly extended around the pressure vessel.

The disclosed stabilizing device 20 uses a belt 24 that moves with the rotation of the pressure vessel 30 to apply pressure to the vessel surface and allow local reciprocation of the path of wind eye 32 to deposit fiber, such as in the form of a filament band 26, while preventing the fiber from slipping from the vessel surface. Such a stabilizing device can take many different forms, using different numbers of rollers, support devices and motion mechanisms than shown. FIGS. 9-19B show exemplary embodiments of a stabilizing device 20 for use with winding machine 40, further including arms 54 connected to respective position actuators 56 at pivot joints 58. In an exemplary configuration as shown in FIG. 9, an inside layer of the endless belt 24 contacts an outer surface of the pressure vessel 30 and wraps around rollers 22 proximate clearance space 44. An outer layer of the endless belt 24 is held against support arms 54 by rollers 60.

Figure 12:
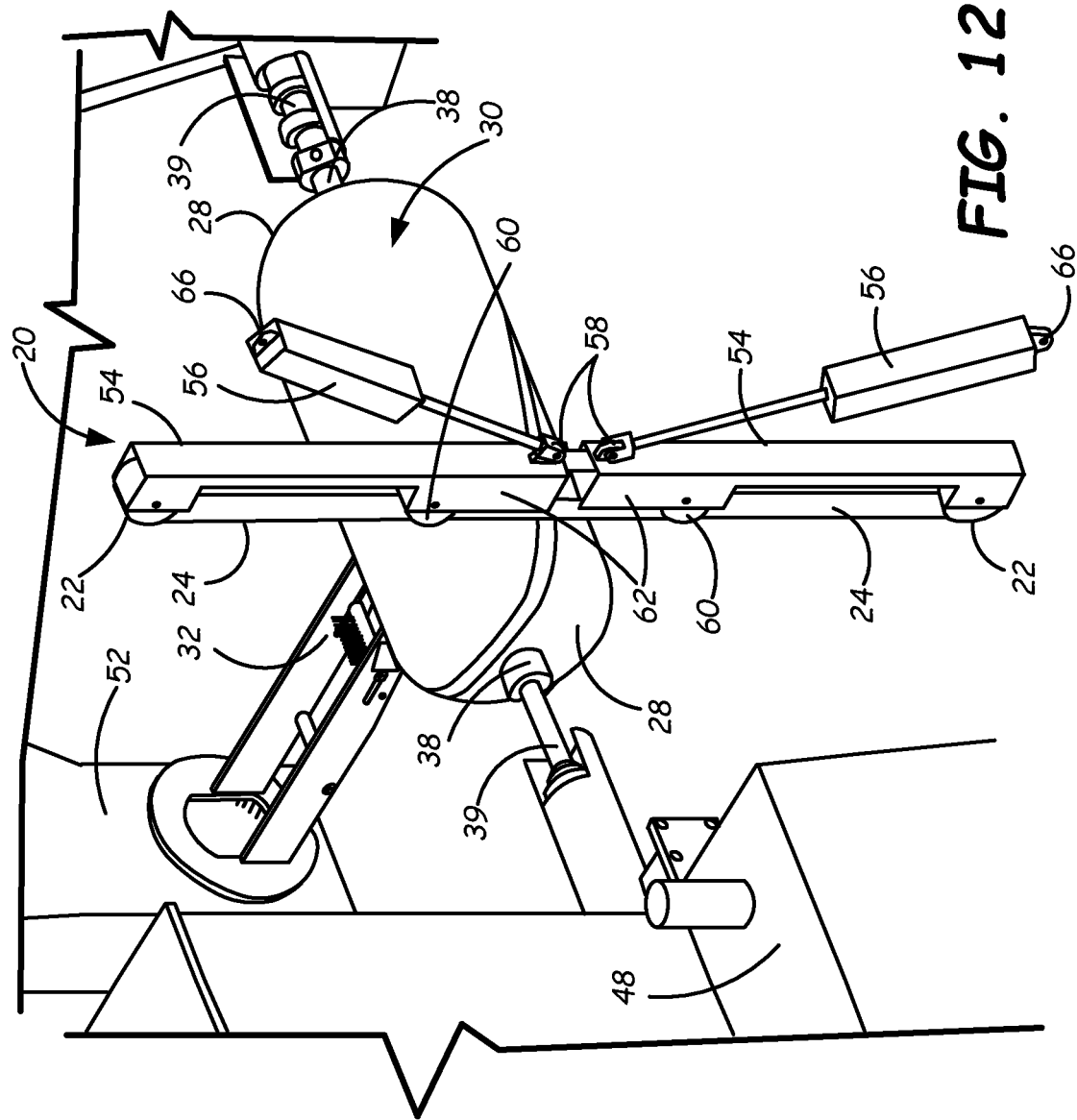
FIG. 12 is similar to FIG. 9 but shows the exemplary stabilizing device with a belt and roller assembly retracted away from the pressure vessel.

With this arrangement, a portion of the endless belt 24 extends around the diameter of the pressure vessel 30 while another greater length portion extends around rollers 22 and against and between support arms 54. With this structure of the stabilizing device 20, an effective length of the belt 24 around and in contact with pressure vessel 30 can be adjusted in various manners. Such adjustment can be used to accommodate a change in pressure vessel diameter as a thickness of the filament band 26 builds under the inner layer of the belt 24. Additionally or alternatively, an effective length of the belt 24 around and in contact with pressure vessel 30 can be adjusted to accommodate different diameters of pressure vessels positioned in the winding machine 40 to receive dome reinforcement filaments thereon. FIGS. 16A-19B show four different manners in which device 20 can provide for effective belt length adjustability around different sizes of pressure vessels 30. It is to be understood that the structures of all of these embodiments are described with reference to configurations in which the device 20 is extended over a pressure vessel 30. While not specifically illustrated for each of these configurations, the devices are also retractable from the pressure vessel 30, as shown in FIGS. 12-14.

Figure 16B:
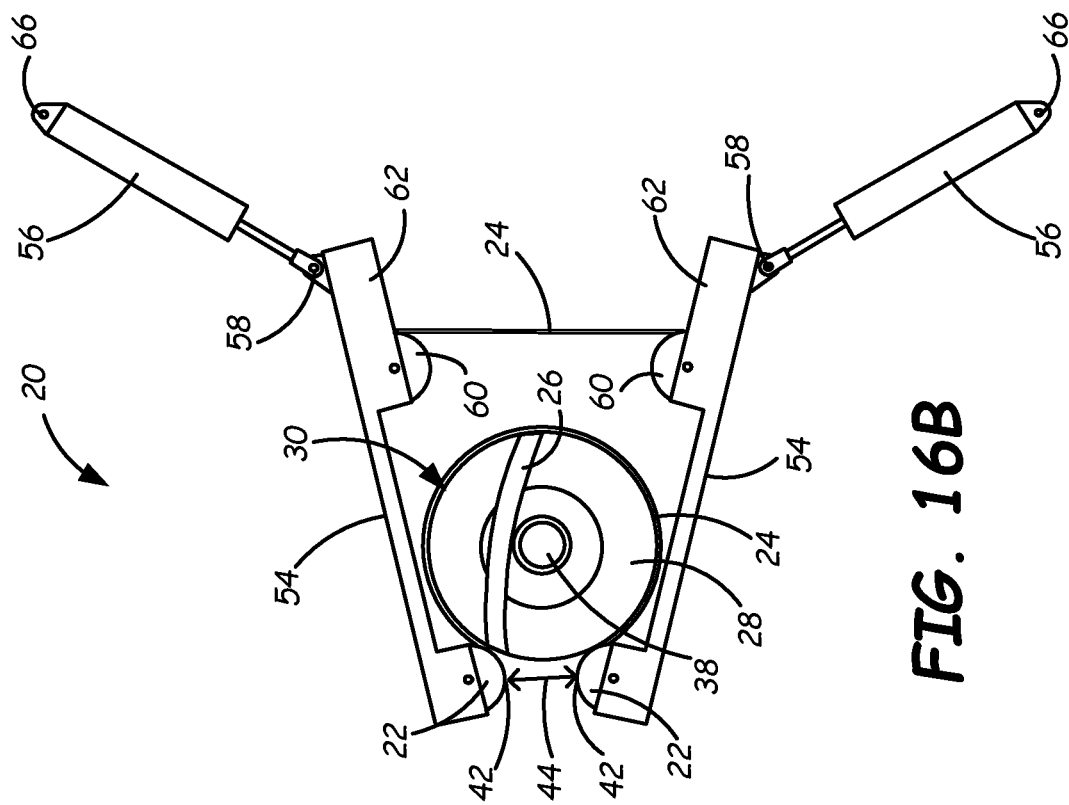
FIG. 16B is similar to FIG. 16A but shows a larger pressure vessel and the device with extended cylinders to position the support arms closer together near the extended cylinders.
Figure 16A:
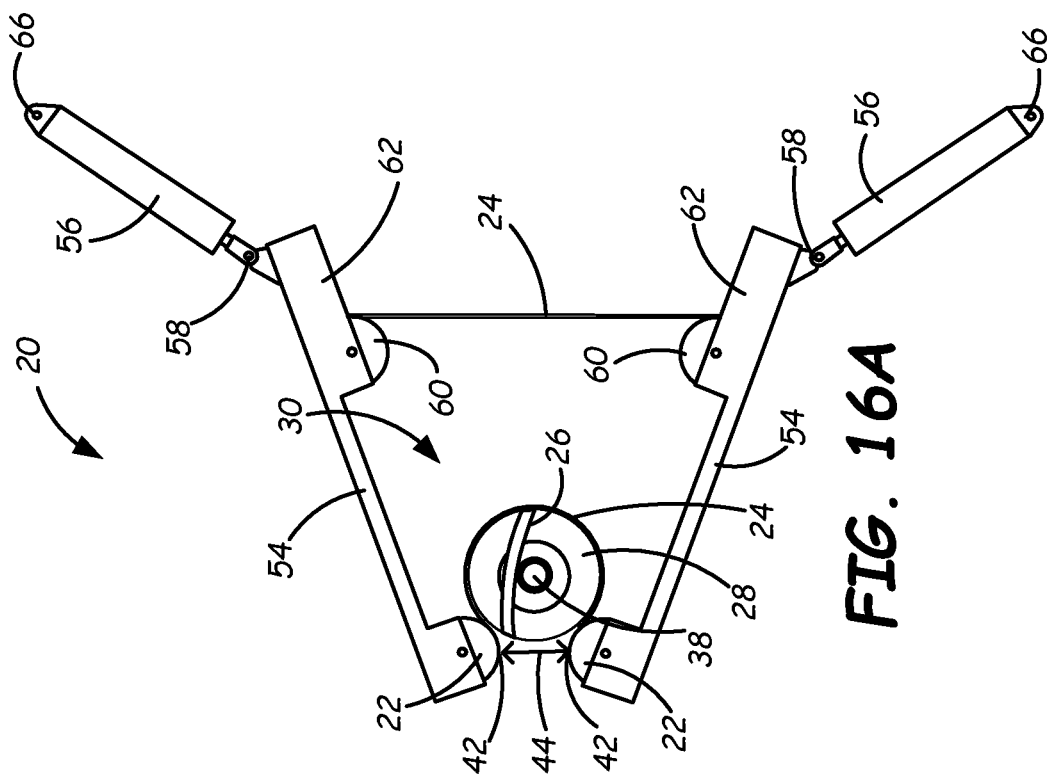
FIG. 16A is an end elevation view, taken from the left side of FIG. 9, showing a small pressure vessel and extended device.

A first adjustment arrangement is shown in FIGS. 16A and 16B, wherein the configuration for a smaller diameter pressure vessel 30 is described with reference to FIG. 16A, and the configuration with respect to a larger diameter pressure vessel 30 is shown with respect to the structures shown in FIG. 16B. FIG. 16A is quite similar to FIG. 10, and the descriptions of FIG. 10 apply accordingly. FIG. 16B shows the position actuators 56 in an extended position to shorten a length of belt 24 between rollers 60. Therefore, an increased length of belt 24 can wrap around the larger pressure vessel 30.

A second adjustment arrangement is shown in FIGS. 17A and 17B, wherein the configuration for a smaller diameter pressure vessel 30 is described with reference to FIG. 17A, and the configuration with respect to a larger diameter pressure vessel 30 is shown with respect to the structures shown in FIG. 17B. FIG. 17A shows a configuration in which axle 74 of roller 60 is slidably received within slot 72 of channels 62. As shown in FIG. 17B, to accommodate a larger diameter pressure vessel 30, roller 60 slides to another point within channel 62 to increase the effective length of belt 24 wrapped around pressure vessel 30. While not specifically shown, such roller motion can be supported by and controlled with an additional set of hydraulic and/or pneumatic cylinders.

A third adjustment arrangement is shown in FIGS. 18A and 18B, wherein the configuration for a smaller diameter pressure vessel 30 is described with reference to FIG. 18A, and the configuration with respect to a larger diameter pressure vessel 30 is shown with respect to the structures shown in FIG. 18B. In FIGS. 18A and 18B, support arm 54 is provided in a two-part configuration with mutually sliding and telescoping arm sections 54a and 54b. FIG. 18A shows the device 20 with a smaller pressure vessel 30. Because relatively less length of belt 24 encircles the pressure vessel 30, actuators 76 are extended to increase a distance between rollers 22 and 60. A longer effective length of support arm 54 is accomplished by sliding arm portion 54b along arm portion 54a. In the illustrated embodiment, ends of each actuator 76 are attached, respectively, to support arm portions 54a and 54b. In FIG. 18B, actuators 56 are extended to accommodate the shorter arms 54.

Figure 19B:
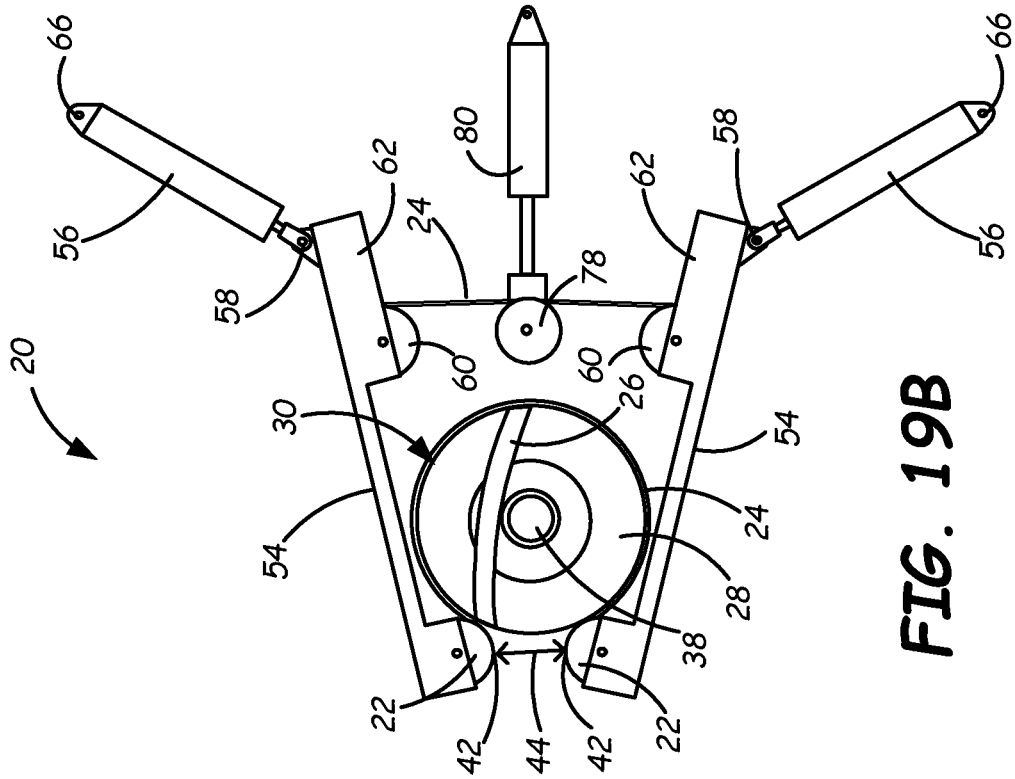
FIG. 19B is similar to FIG. 19A but shows the position actuator in an extended configuration, to accommodate a larger pressure vessel.
Figure 19A:
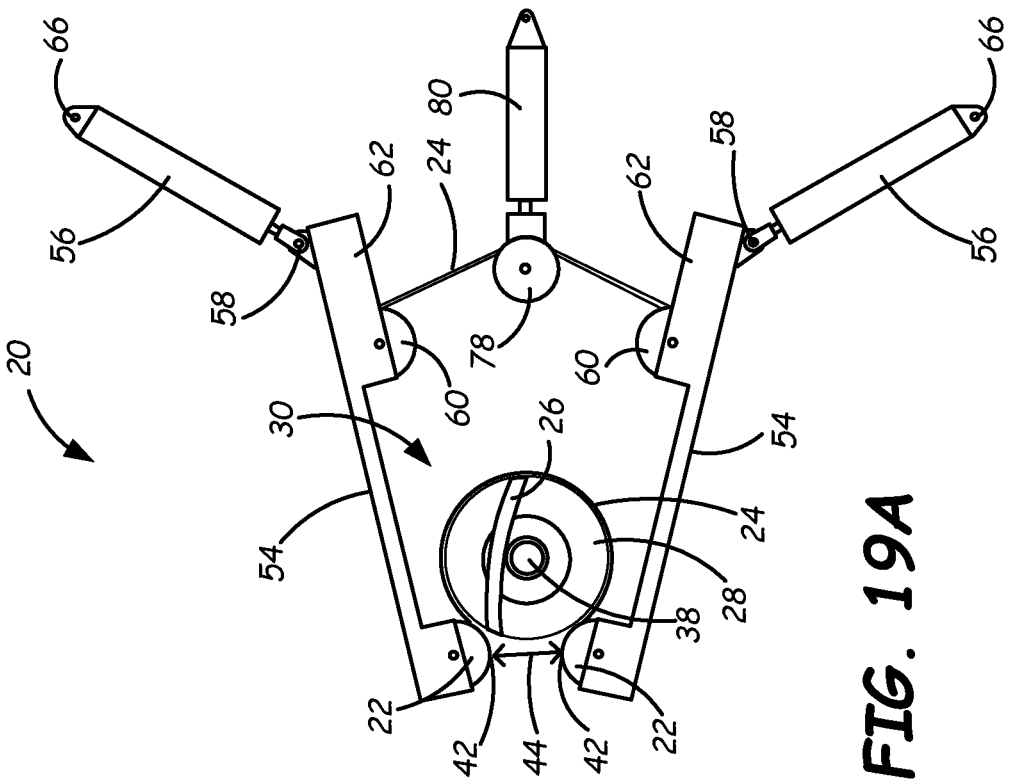
FIG. 19A is an end elevation view, taken from the left side of FIG. 9, showing a smaller pressure vessel with an extended device, with an additional belt roller attached to a retracted position actuator.

A fourth adjustment arrangement is shown in FIGS. 19A and 19B, wherein the configuration for a smaller diameter pressure vessel 30 is described with reference to FIG. 19A, and the configuration with respect to a larger diameter pressure vessel 30 is shown with respect to the structures shown in FIG. 19B. FIGS. 19A and 19B show an arrangement using an additional roller 78 on a portion of belt 24 spanning between the rollers 60. As shown in FIG. 19A, an effective length of the belt 24 between the rollers 60 is increased by retraction of actuator 80. As shown in FIG. 19B, actuator 80 is extended, to decrease the length of belt 24 between rollers 60 and increase an effective length of belt 24 around the larger pressure vessel 30.

FIGS. 12-14 show device 20 in a retracted configuration, wherein the rollers 22 are lifted off the pressure vessel 30, as in directions 64 depicted in FIG. 2. While not shown in some drawing figures to prevent obscuring of views of the described components, end 66 of each of the position actuators 56 is pivotally attached to frame 46 or another support of a modified winding machine 40. In an exemplary embodiment, positioning actuator 56 is an extendable cylinder that can be actuated by means including the use of electronics or hydraulic or pneumatic fluid, for example. As shown in FIGS. 12-14, when the positioning actuators 56 are extended, the rollers 22 and belt 24 are retracted away from pressure vessel 30. In an exemplary embodiment, this change in configuration is caused by pivoting of end 66 of position actuator 56 at its connection to frame 46 and pivoting of support arms 54 at an opposite pivot joint 58 of position actuator 56. This retracted position of the stabilizing device 20 shown in FIGS. 12-14 allows for insertion, removal, and other positional adjustments of pressure vessel 30 within the winding machine 40.

Figure 10:
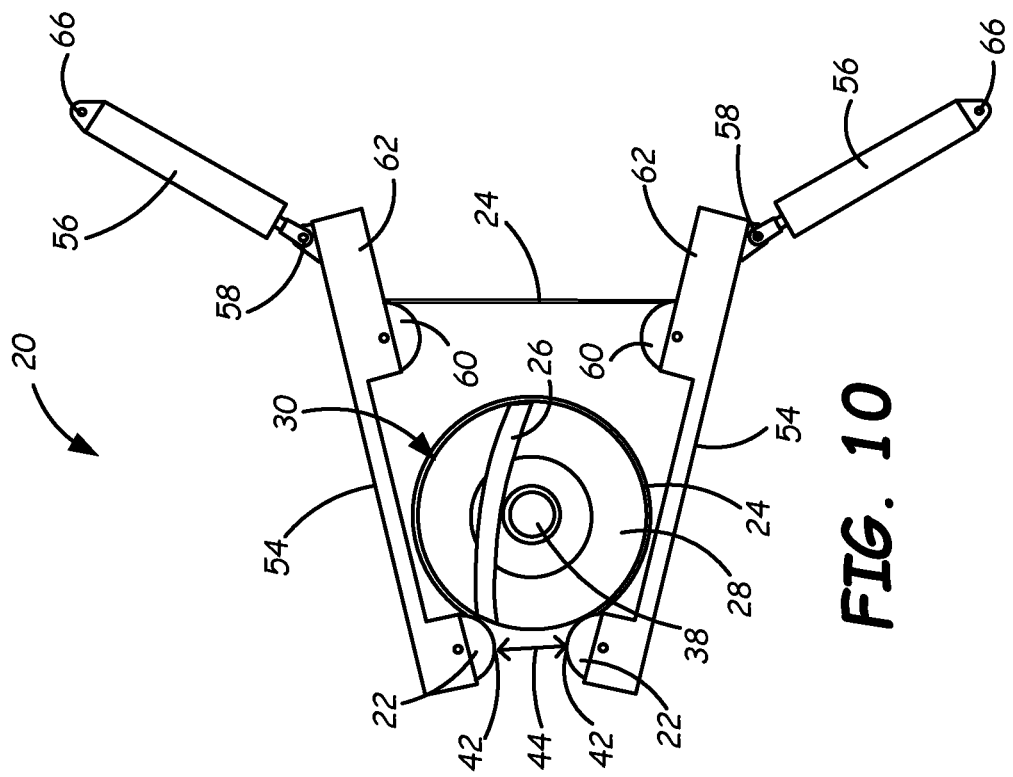
FIG. 10 is an end elevation view, taken from the left side of FIG. 9 and showing the pressure vessel and extended device.

A change in position between the extended device 20 shown in FIGS. 9-11 and the retracted device 20 shown in FIGS. 12-14 can be affected automatically by software run by controller 48 and/or controlled manually by user input into user interface 50. While not specifically illustrated, any user interface may be used, such a one including a keyboard, monitor, touchscreen, knobs, buttons, or levers, for example.

As shown in FIGS. 9-11, in an exemplary embodiment of a device 20, when rollers 22 are extended so that an inner layer of the endless belt 24 is in contact with a portion of an outer circumference of pressure vessel 30, the arms 54 are inclined so that a distance between the pair of arms 54 at contact rollers 22 is less than a distance between the pair of arms 54 proximate rollers 60, which are not in contact with pressure vessel 30. Additionally, in an exemplary embodiment, as shown in FIG. 11, a distance between the pair of arms 54 proximate contact rollers 22 is less than a distance between the pair of arms 54 proximate frame 46.

In this manner, the clearance space 44 is maintained at a relatively small distance, sufficient to allow linear left and right motion of wind eye 32 via motion of carriage 52. This configuration places an inner layer of the endless belt 24 in contact with a significant majority of the circumference of pressure vessel 30. Thus, pressure is maintained by the rollers 22 and belt 24 on filament bands 26 laid on the pressure vessel surface in order to press the resin impregnated filament onto the pressure vessel surface and facilitate bonding between the filament band 26 and the underlying pressure vessel surface and underlying filament bands. By providing the compression belt 24 as an endless belt around rollers 22 (and in some embodiments also rollers 60), the belt surface moves around the rollers 22, 60 with the pressure vessel 30 as the pressure vessel 30 rotates on rotating shaft 39. Thus, there is no relative motion at a contact point of belt 24 on the underlying pressure vessel surface or filament band 26. Accordingly, uniform compression is applied to the pressure vessel 30 and the newly deposited filament bands 26, without any slippage between the compression belt 24 and underlying surfaces of filament bands 26 or pressure vessel 30.

Slippage between the belt 24 and the underlying liner or composite shell of the vessel 30 would displace composite material of the filament band 26 and could compromise the strength of the material. Thus, belt 24 is maintained under tension in order to keep a relatively high level of contact pressure with the underlying liner or composite shell of the vessel 30. The high contact pressure also serves to prevent the ends of filament band 26 from pulling out from under the belt 24 as the winding band 26 pulls away in tension. An effective length of the belt 24 in contact with vessel 30 and its pressure application is selected by how the device 20 is positioned around vessel 30. In one embodiment, all the rollers 22, 60 are free wheeling (not driven); the rotating vessel 30 would supply the driving rotational force for the system. In an alternative embodiment, rollers 22 could be driven and turned at slightly different rates to create additional tension in the belt 24 in the region in contact with the underlying liner or composite shell of the vessel 30.

The consistent application of pressure by belt 24 and rollers 22 provides for ease and reliability of manufacturing with few moving parts. The stabilizing device 20 remains in this consistent extended position as the wind eye 32 of the winding machine 40 traverses left and right, while the pressure vessel 30 simultaneously rotates on rotating shaft 39 in rotation direction 36, to form the dome reinforcement pattern shown in FIG. 5, which eventually results in the closed pattern of dome cap 34, shown in FIG. 6. As shown in FIGS. 9-14, the rollers 22 and belt 24 are movable into and out of position against pressure vessel 30. After formation of the dome cap 34 is complete, the stabilizing apparatus 20 can be removed from the pressure vessel 30, such as by retraction of rollers 22 and the attached belt 24 in directions 64, as illustrated in FIG. 2.

In an exemplary retracted configuration as shown in FIGS. 12-14, the support arms 54 are linearly aligned with each other in a substantially vertical configuration. This retraction moves the attached rollers 22 and belt 24 away from the surface of pressure vessel 30. Thus, a position of the pressure vessel 30 relative to winding machine 40 can be adjusted, including removal of pressure vessel 30 from the winding machine 40. In an exemplary method of reinforcing the dome ends 28 of a pressure vessel 30, after the formation of one dome cap 34, the pressure vessel 30 is turned so that its other dome end 28 is positioned for reception of filament bands 26 thereon, deposited by wind eye 32. Thus, an exemplary completed pressure vessel 30 will have a dome cap 34 on each of the two opposed ends 28 of the pressure vessel 30. In another method, both the wind eye carriage 52 and the device 20 are moved to the second end 28 of the pressure vessel 30 so that the vessel need not be repositioned within machine 40. While FIGS. 12-14 illustrate the adjustment arrangement of FIGS. 16A-16B, the adjustment arrangements of FIGS. 17A-17B, 18A-18B, or 19A-19B could be configured such that in a retracted configuration, the support arms 54 are linearly aligned with each other in a substantially vertical configuration.

FIG. 15 is a top plan view of an exemplary winding machine 40, modified to support stabilizing device 20, which is shown in the extended position illustrated in FIGS. 9-11. Wind eye 32 on carriage 52 traverses left and right (in directions 68) to deposit filament band 26 in a low angle, helical winding pattern on pressure vessel 30, as shown in FIGS. 1-5, for example. In one embodiment, the stabilizing device 20 can be attached to another carriage, such as at pivot end 66, to also move in directions 68. Thus, a position of the compression belt 24 along a length of pressure vessel 30 can be adjusted depending on a size of the pressure vessel 30 and configuration of its dome ends 28.

Exemplary, non-limiting embodiments of an assembly and method are described. For example, an assembly is configured for use in a system for forming filament windings 26 on a vessel 30 having a circumference and a length, the assembly comprising an endless belt 24 and first and second rollers 22. The endless belt 24 is configured to wrap partially around the circumference of the vessel 30 to contact and impart pressure on a filament winding 26 disposed on an outside surface of the vessel 30. The endless belt 24 moves around the first and second rollers 22. A space 44 is disposed between the first and second rollers 22 to allow passage of a filament wind eye 32 of the system configured to move in a reciprocal motion 68 along the length of the vessel 30.

In an exemplary embodiment, the endless belt 24 moves around third and fourth rollers 60. In an exemplary embodiment, the first roller 22 and third roller 60 are attached to a first arm 54 that is configured to connect to a frame 46 of the system. Moreover, the second roller 22 and fourth roller 60 are attached to a second arm 54 that is configured to connect to the frame 46. In an exemplary embodiment, the first arm 54 comprises a channel 62 along which the third roller 60 is configured to roll.

In an exemplary embodiment, a first arm 54 is attached to the first roller 22 and configured to connect to a frame 46 of the system, and a second arm 54 is attached to the second roller 22 and configured to connect to the frame 46. In an exemplary embodiment, a first extendable actuator 56 is disposed between the first arm 54 and the frame 46, and a second extendable actuator 56 disposed between the second arm 54 and the frame 46. In an exemplary embodiment, the first extendable actuator 56 is pivotally attached to the first arm 54, and the second extendable actuator 56 is pivotally attached to the second arm 54. In an exemplary embodiment, the first extendable actuator 56 is pivotally attached to the frame 46, and the second extendable actuator 56 is pivotally attached to the frame 46.

In an exemplary embodiment, the first and second arms 54 are movable between a first configuration shown in FIGS. 9-11 and 15 and a second configuration shown in FIGS. 12-14. In the first configuration, the first and second rollers 22 place the endless belt 24 in contact with the outside surface of the vessel 30 and the filament winding 26 disposed thereon. In the second configuration, the first and second rollers 22 remove the endless belt 24 from contact with the outside surface of the vessel 30 and the filament winding 26 disposed thereon. In an exemplary embodiment, in the first configuration, a distance between the first and second arms 54 proximate the first and second rollers 22 is less than a distance between the first and second arms 54 proximate the frame 46. In an exemplary embodiment, in the second configuration, the first and second arms 54 are aligned co-linearly.

In an exemplary embodiment, a method of using a machine 40 for forming filament windings on a vessel 30 having a circumference and a length is described. In an exemplary embodiment, the method comprises rotating the vessel 30 on a rotating shaft 39; moving a filament wind eye 32 in a reciprocal motion 68 along the length of the vessel 30 while depositing a filament winding 26 on an outside surface of the vessel 30; and wrapping an endless belt assembly 22, 24 partially around the circumference of the vessel 30 to contact and impart pressure on the filament winding 26. In an exemplary embodiment, a space 44 is disposed in the assembly 22, 24 at the outside surface of the vessel 30 to allow passage of the filament wind eye 32.

In an exemplary embodiment, the method comprises extending a belt 24 of the endless belt assembly around first and second rollers 22 about which the belt 24 moves. In an exemplary embodiment, wrapping the endless belt assembly partially around the circumference of the vessel 30 comprises extending a first arm 54 attached to the first roller 22 from a frame 46 of the machine 40 and extending a second arm 54 attached to the second roller 22 from the frame 46 of the machine 40. In an exemplary embodiment, the method comprises retracting the first and second arms 54 to remove the belt 24 from contact with the outside surface of the vessel 30 and the filament winding 26 disposed thereon. In an exemplary embodiment, retracting the first arm 54 comprises extending a cylinder 56 that is pivotally connected to the first arm 54 and to the frame 46 of the machine 40.

In an exemplary embodiment, the method comprises changing an effective length of the belt 24 between the first and second rollers 22 around the circumference of the vessel 30 in contact with the filament winding 26. In an exemplary embodiment, the method comprises extending the belt 24 around third and fourth rollers 60 about which the endless belt 24 moves. In an exemplary embodiment, changing the effective length of the belt 24 between the first and second rollers 22 comprises moving the third roller 60 along the first arm 54.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa. All references mentioned in this disclosure are hereby incorporated by reference.

The invention claimed is:

1. An assembly configured for use in a system for forming filament windings on a vessel having a circumference and a length, the assembly comprising:
    an endless belt configured to wrap partially around the circumference of the vessel to contact and impart pressure on a filament winding disposed on an outside surface of the vessel; and
    first and second rollers about which the endless belt moves;
    wherein a space is disposed between the first and second rollers to allow a filament wind eye of the system to move in a reciprocal motion along the length of the vessel.

2. The assembly of claim 1 comprising third and fourth rollers about which the endless belt moves.

3. The assembly of claim 2 wherein:
    the first and third rollers are attached to a first arm that is configured to connect to a frame of the system; and
    the second and fourth rollers are attached to a second arm that is configured to connect to the frame.

4. The assembly of claim 3 wherein the first arm comprises a channel along which the third roller is configured to roll.

5. The assembly of claim 1 comprising:
    a first arm attached to the first roller and configured to connect to a frame of the system; and
    a second arm attached to the second roller and configured to connect to the frame.

6. The assembly of claim 5 comprising:
    a first extendable actuator disposed between the first arm and the frame; and
    a second extendable actuator disposed between the second arm and the frame.

7. The assembly of claim 6 wherein:
    the first extendable actuator is pivotally attached to the first arm; and
    the second extendable actuator is pivotally attached to the second arm.

8. The assembly of claim 6 wherein:
    the first extendable actuator is pivotally attached to the frame; and
    the second extendable actuator is pivotally attached to the frame.

9. The assembly of claim 5 wherein the first and second arms are movable between:
    a first configuration in which the first and second rollers place the endless belt in contact with the outside surface of the vessel and the filament winding disposed thereon; and
    a second configuration in which the first and second rollers remove the endless belt from contact with the outside surface of the vessel and the filament winding disposed thereon.

10. The assembly of claim 9 wherein in the first configuration, a distance between the first and second arms proximate the first and second rollers is less than a distance between the first and second arms proximate the frame.

11. The assembly of claim 9 wherein in the second configuration, the first and second arms are aligned co-linearly.

12. A method of using the assembly of claim 1, the method comprising:
    rotating the vessel on a rotating shaft;
    moving the filament wind eye in the reciprocal motion through the space and along the length of the vessel while depositing the filament winding on the outside surface of the vessel; and
    wrapping the endless belt partially around the circumference of the vessel to contact and impart pressure on the filament winding.

13. The method of claim 12 comprising extending the endless belt around first and second rollers about which the belt moves.

14. The method of claim 13 wherein wrapping the endless belt partially around the circumference of the vessel comprises:
    extending a first arm attached to the first roller from a frame of a machine; and
    extending a second arm attached to the second roller from the frame of the machine.

15. The method of claim 14 comprising retracting the first and second arms to remove the belt from contact with the outside surface of the vessel and the filament winding disposed thereon.

16. The method of claim 15 wherein retracting the first arm comprises extending a cylinder that is pivotally connected to the first arm and to the frame of the machine.

17. The method of claim 14 comprising changing an effective length of the belt between the first and second rollers around the circumference of the vessel in contact with the filament winding.

18. The method of claim 17 comprising extending the belt around third and fourth rollers about which the belt moves.

19. The method of claim 18 wherein changing the effective length of the belt between the first and second rollers comprises moving the third roller along the first arm.

20. The method of claim 18 wherein changing the effective length of the belt between the first and second rollers comprises moving the first arm.

* * * * *